US012131830B2

(12) United States Patent
Singh (10) Patent No.: US 12,131,830 B2
(45) Date of Patent: Oct. 29, 2024

(54) AUTOMATICALLY ADJUSTING SEISMIC RESTRAINT SYSTEM FOR NUCLEAR FUEL STORAGE

(71) Applicant: HOLTEC INTERNATIONAL, Camden, NJ (US)

(72) Inventor: Krishna P. Singh, Jupiter, FL (US)

(73) Assignee: HOLTEC INTERNATIONAL

( * ) Notice: Subject to any disclaimer, the term of this patent is extended or adjusted under 35 U.S.C. 154(b) by 437 days.

(21) Appl. No.: 17/723,999

(22) Filed: Apr. 19, 2022

(65) Prior Publication Data

US 2022/0336115 A1  Oct. 20, 2022

Related U.S. Application Data (60) Provisional application No. 63/176,496, filed on Apr. 19, 2021.

(51) Int. Cl.
*G21C 19/07* (2006.01)
*G21C 9/04* (2006.01)
(Continued)

(52) U.S. Cl.
CPC .............. *G21C 19/07* (2013.01); *G21C 9/04* (2013.01); *G21C 19/40* (2013.01); *G21F 5/08* (2013.01)

(58) Field of Classification Search
CPC .......... G21C 19/07; G21C 9/04; G21C 19/40; G21C 19/06; G21F 5/08
(Continued)

(56) References Cited

U.S. PATENT DOCUMENTS

| 3,194,746 A | 7/1965 | Hackett |
| 3,515,638 A | 6/1970 | Nims, Jr. |

(Continued)

FOREIGN PATENT DOCUMENTS

| FR | 2786019 A1 * | 5/2000 | ............ G21C 19/07 |
| JP | 2015184134 | 10/2015 | |
| JP | 2020122711 A | 8/2020 | |

OTHER PUBLICATIONS

International Search Report and the Written Opinion of PCT/US2022/25362 dated Aug. 1, 2022.

*Primary Examiner* — Jack W Keith
*Assistant Examiner* — Daniel Wasil
(74) *Attorney, Agent, or Firm* — The Belles Group, P.C.

(57) ABSTRACT

An automatically adjusting seismic restraint system for nuclear fuel storage in one embodiment comprises a free-standing first fuel storage component (FSC) configured to contain nuclear fuel, and a stationary second FSC configured to receive the first fuel storage component. An inter-body gap formed between the FSCs includes at least one seismic restraint assembly. The assembly includes a stationary wedge member fixedly coupled to the second FSC and a movable loose wedge member engaged with and supported in place by the stationary wedge member. The stationary wedge member defines an inclined load bearing surface slideably engaged with a mating inclined load bearing surface of the loose wedge member. During a seismic event or thermal expansion of the first FSC, the first FSC moves towards the second FSC which shrinks the inter-body gap and the loose wedge member is vertically displaced relative to the stationary wedge member while maintaining engagement therewith.

17 Claims, 9 Drawing Sheets

(51) Int. Cl.
*G21C 19/40* (2006.01)
*G21F 5/08* (2006.01)

(58) Field of Classification Search
USPC .................................... 376/272, 285
See application file for complete search history.

(56) References Cited

U.S. PATENT DOCUMENTS

| | | | |
|---|---|---|---|
| 4,436,693 A * | 3/1984 | Zezza | G21C 19/07 |
| | | | 250/507.1 |
| 4,711,758 A * | 12/1987 | Machado | G21C 19/40 |
| | | | 376/272 |
| 4,752,436 A | 6/1988 | Snyder | |
| 5,502,754 A | 3/1996 | Erbes | |
| 5,583,899 A | 12/1996 | Relf | |
| 5,621,778 A | 4/1997 | Erbes | |
| 6,240,156 B1 | 5/2001 | Matsumoto et al. | |
| 6,343,107 B1 | 1/2002 | Erbes et al. | |
| 6,788,756 B2 | 9/2004 | Erbes | |
| 8,705,686 B2 | 4/2014 | Sprague et al. | |
| 9,874,001 B2 | 1/2018 | Lombardo et al. | |
| 2008/0137793 A1 | 6/2008 | Erbes et al. | |
| 2013/0170598 A1 | 7/2013 | Komuro et al. | |
| 2020/0027600 A1 | 1/2020 | Singh et al. | |
| 2020/0365286 A1 | 11/2020 | Markham et al. | |

* cited by examiner

AUTOMATICALLY ADJUSTING SEISMIC RESTRAINT SYSTEM FOR NUCLEAR FUEL STORAGE

CROSS-REFERENCE TO RELATED APPLICATIONS

The present application claims the benefit of priority to U.S. Provisional Application No. 63/176,496 filed Apr. 19, 2021, which is incorporated herein by reference in its entirety.

BACKGROUND

The present disclosure is related to nuclear generation facilities, and more particularly to seismic restraint systems and related methods comprising a slideable seismic restraint assemblies for supporting free standing nuclear fuel storage components during a seismic event.

Massive spent nuclear fuel storage components such as a steel multi-purpose canister (MPC) loaded with nuclear fuel and disposed in an outer radiation-shielded concrete and steel overpack or cask, and a steel spent nuclear fuel rack submerged in a fuel pool belong to the class of "free standing components" (FSC) that are routinely employed at nuclear plants. The term "free standing" connotes that these fuel storage components are not fixedly or rigidly coupled in place to another structure. These FSCs must be designed to withstand the vibratory inertia loads caused by seismic events such as earthquakes without damaging the integrity of the fuel storage containment.

To mitigate the effect of the seismic loading, such free-standing components (FSC) which store spent nuclear fuel (SNF) must be physically restrained from rattling motion induced by the vibratory forces imposed thereon and possibly severe impacts with adjacent structures. In the case of the MPC, it is the inside wall of the storage cask which houses the MPC that must be protected from severe inertia loads and impact therefrom during a seismic event. In the case of free-standing fuel racks in submerged wet storage in the fuel pool, it is the adjacent pool wall for perimetrically located racks or another adjacent rack which must be protected from impacts with the FSC. A small gap between the FSC and the adjacent structure (hereafter called the "inter-body gap"), be it stationary as in the case of the fuel canister's massive outer storage cask or the reinforced concrete fuel pool wall, or movable as in the case of an adjacent fuel rack in the fuel pool, is necessary to facilitate the FSCs installation and to allow for its thermal growth during operation and to accommodate movement induced by vibratory forces during a seismic event. In the case of the MPC, the diametral thermal growth alone during operation can be as much as +−⅜ inch as the FSC's expand due to decay heat emitted by the SNF stores in these nuclear fuel storage components.

Improvements in seismic restraints which can be located in inter-body gap and which also can provide restraint from excessive movement during a seismic event and accommodate thermal growth of nuclear fuel storage components during normal operation.

BRIEF SUMMARY

The present disclosure provides an automatically adjusting seismic restraint system configured for nuclear fuel storage. The system in one embodiment provides a 2-piece slideably moveable seismic restraint assembly at the inter-body gap between a free-standing first fuel storage component and an adjacent second fuel storage component be it either free-standing or stationary in nature (e.g., outer storage cask or fuel pool vertical wall). In another embodiment, a 3-piece slideably movable seismic restraint assembly is provided for use between two free-standing fuel storage components. Either embodiment advantageously provides protection against excessive movement and collision between the fuel storage components during a seismic event (e.g., earthquake) in addition to compensating for thermal expansion or shrinkage of one or more of the fuel storage components.

In one aspect, an automatically adjusting seismic restraint system for nuclear fuel storage comprises: a free-standing first fuel storage component configured to contain nuclear fuel and defining a vertical centerline; a stationary second fuel storage component configured to receive the first fuel storage component; an inter-body gap formed between the first and second fuel storage components; at least one seismic restraint assembly disposed in the inter-body gap and including a stationary wedge member and a movable loose wedge member; the stationary wedge member fixedly coupled to the second fuel storage component, the stationary wedge member being disposed in the inter-body gap; the stationary wedge member defining an inclined load bearing surface; the movable loose wedge member disposed in the inter-body gap, the loose wedge member defining an inclined load bearing surface slideably engaged with the inclined load bearing surface of the stationary wedge member; wherein during a seismic event or thermal expansion of the first fuel storage component, the first fuel storage component moves towards the second fuel storage component which shrinks the inter-body gap and the loose wedge member is vertically displaced relative to the stationary wedge member. The loose wedge member is configured and operable such that its inclined load bearing surface slides along and maintains contact with the inclined load bearing surface of the stationary wedge member when the loose wedge member is displaced vertically. The inclined load bearing surfaces of both the stationary and loose wedge members are flat defining a flat-to-flat sliding interface therebetween. In various embodiments, the loose wedge member and stationary wedge member are formed from horizontally elongated metallic bars comprising complementary arcuately curved shapes or straight shaped bars.

A method for using the foregoing system comprises: the free-standing first fuel storage component thermally expanding in a radial or lateral direction; the inter-body gap shrinking via thermal expansion of the first fuel storage component; and the loose wedge member sliding vertically upwards along the stationary wedge member while maintaining contact with the stationary wedge member.

In another aspect, an automatically adjusting seismic restraint system for nuclear fuel storage comprises: a free-standing first fuel storage component configured to contain nuclear fuel and defining a vertical centerline; a free-standing second fuel storage component configured to contain nuclear fuel and defining a vertical centerline; an inter-body gap formed between the first and second fuel storage components; at least one seismic restraint assembly disposed in the inter-body gap, the seismic restraint assembly including a pair of first and second stationary wedge members and a movable double-tapered wedge member disposed between the first and second stationary wedge members; the first stationary wedge member fixedly coupled to the first fuel storage component within the inter-body gap; the second stationary wedge member fixedly coupled to the second fuel storage component within the inter-body gap and spaced laterally apart from the first stationary wedge member to define an interstitial space therebetween; the double-tapered wedge member disposed in the interstitial space and slideably supported by first and second stationary wedge members; wherein during a seismic event or thermal expansion of the first or second fuel storage component, the inter-body gap between the first fuel storage component shrinks and the double-tapered wedge member is vertically displaced relative to the first and second stationary wedge members.

The double-tapered wedge member defines a first inclined load bearing surface on one side and a second load bearing surface on an opposite side, the first inclined load bearing surfaces being slideably engaged with a corresponding inclined load bearing surface of the first stationary wedge member, and the second inclined load bearing surface being slideably engaged with a corresponding inclined load bearing surface of the second stationary wedge member. The double-tapered wedge member is configured and operable such that its inclined load bearing surface slides along and maintains contact with the inclined load bearing surface of the stationary wedge member when the loose wedge member is displaced vertically. The first and second inclined load bearing surfaces of the double-tapered wedge member and the inclined load bearing surfaces of the first and second stationary wedge members are flat defining a flat-to-flat sliding interface between the first and second stationary wedge members and the double-tapered wedge member. In one embodiment, the double-tapered wedge member has a trapezoidal shaped body in transverse cross section and is formed a straight metallic and horizontally elongated bar. The first and second stationary wedge members may be similarly constructed and shaped.

A method for using the foregoing system with the double-tapered wedge member and first and second stationary wedge members comprises: at least one of the free-standing first fuel storage component and the free-standing second fuel storage component thermally expanding in a lateral direction; the inter-body gap shrinking via thermal expansion of the at least one of the first or second fuel storage component; and the double-tapered wedge member sliding vertically upwards along the first and second stationary wedge member while maintaining contact with both of the stationary wedge members.

BRIEF DESCRIPTION OF THE DRAWINGS

The present invention will become more fully understood from the detailed description and the accompanying drawings, wherein like elements are labeled similarly and in which.

All drawings are considered schematic and not necessarily to scale. Features or items shown numbered in certain figures which may appear un-numbered in other figures are the same features or items unless noted otherwise herein.

DETAILED DESCRIPTION

The features and benefits of the invention are illustrated and described herein by reference to non-limiting examples in which aspects of the disclosure may be embodied. This description of examples is intended to be read in connection with the accompanying drawings or photos, which are to be considered part of the entire written description. Accordingly, the disclosure expressly should not be limited to such examples illustrating some possible non-limiting combination of features that may exist alone or in other combinations of features disclosed herein.

In the description of examples disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range.

Figure 1:
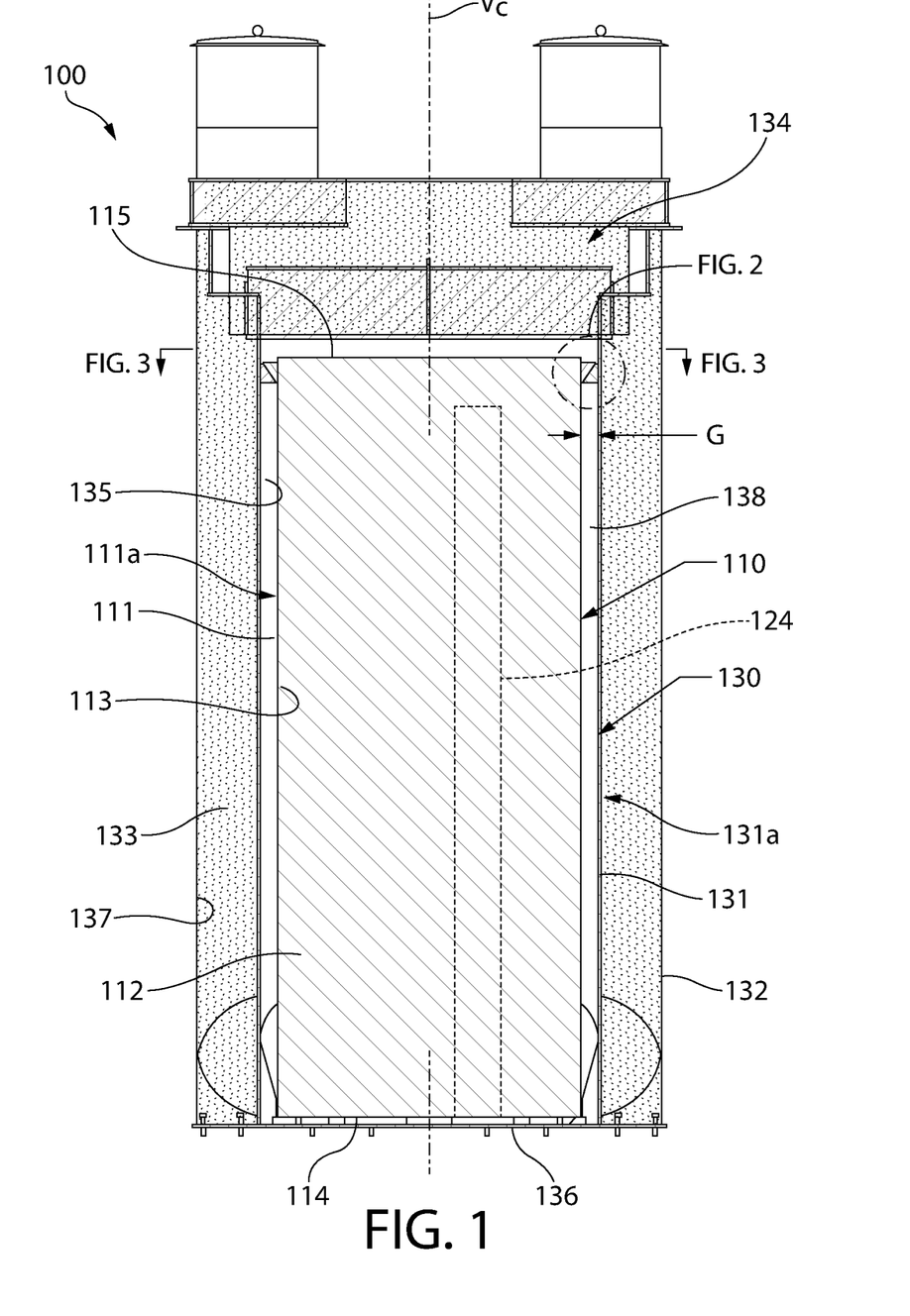
FIG. 1 is a side cross sectional view of a first embodiment of a nuclear fuel storage system comprising a spent nuclear fuel canister, an outer radiation-shielded storage cask, and a seismic restraint system according to the present disclosure disposed therebetween.
Figure 2A:
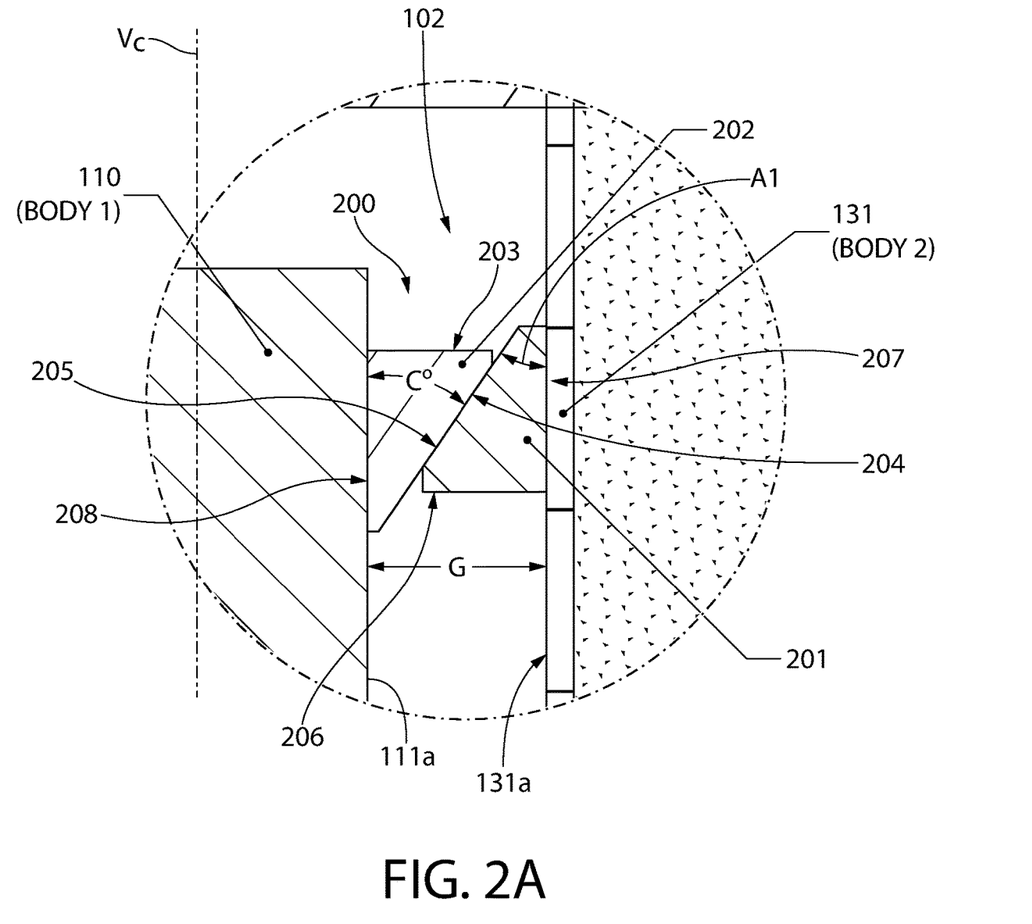
FIG. 2A is an enlarged detail taken from FIG. 1 showing the seismic restraint assembly of the seismic restraint system in a first operating position.
Figure 2B:
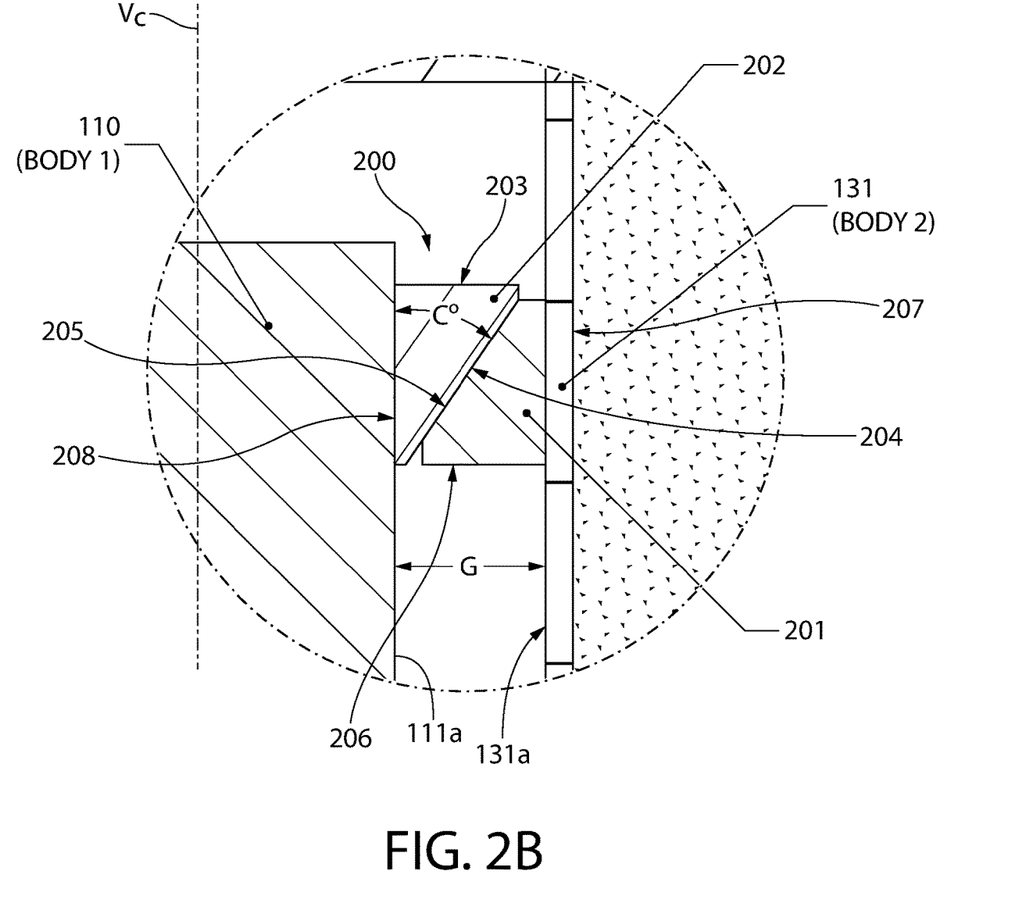
FIG. 2B is the enlarged detail of FIG. 2A but showing the seismic restraint assembly slideably moved into a second operating position.
Figure 3:
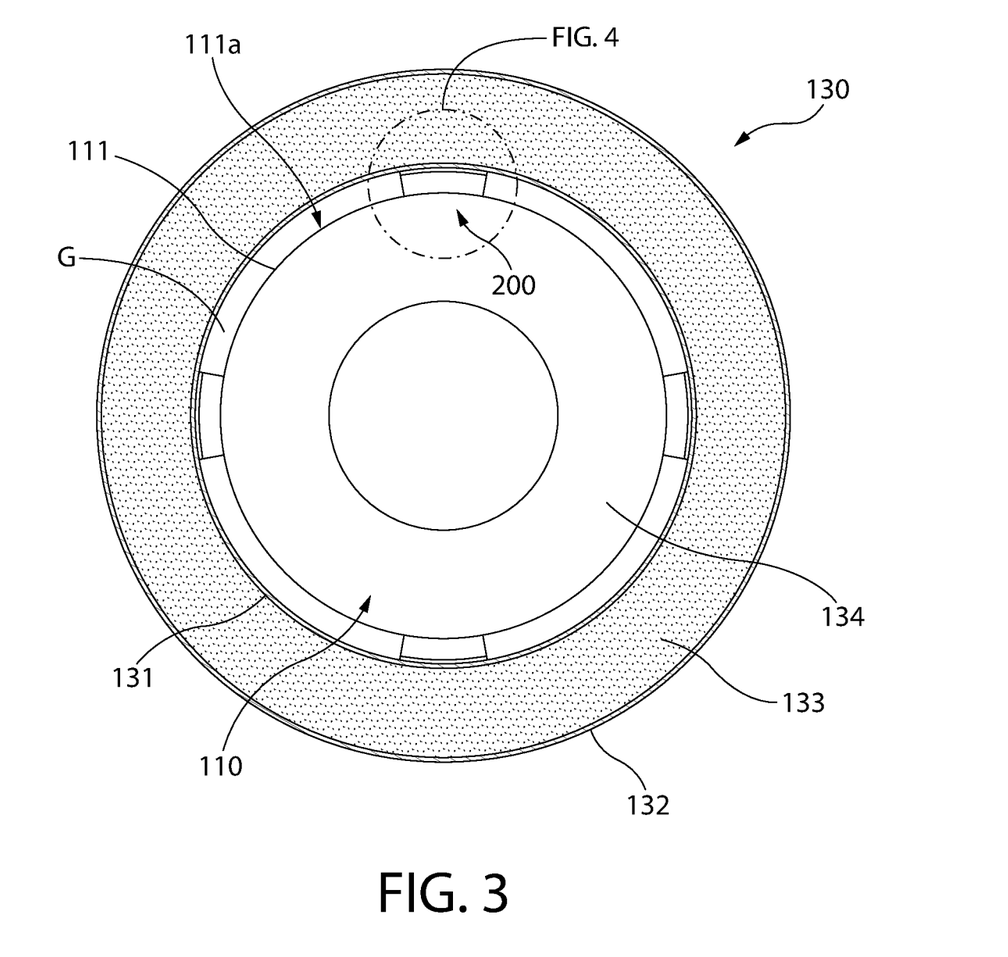
FIG. 3 is a transverse cross sectional view taken from FIG. 1.
Figure 4:
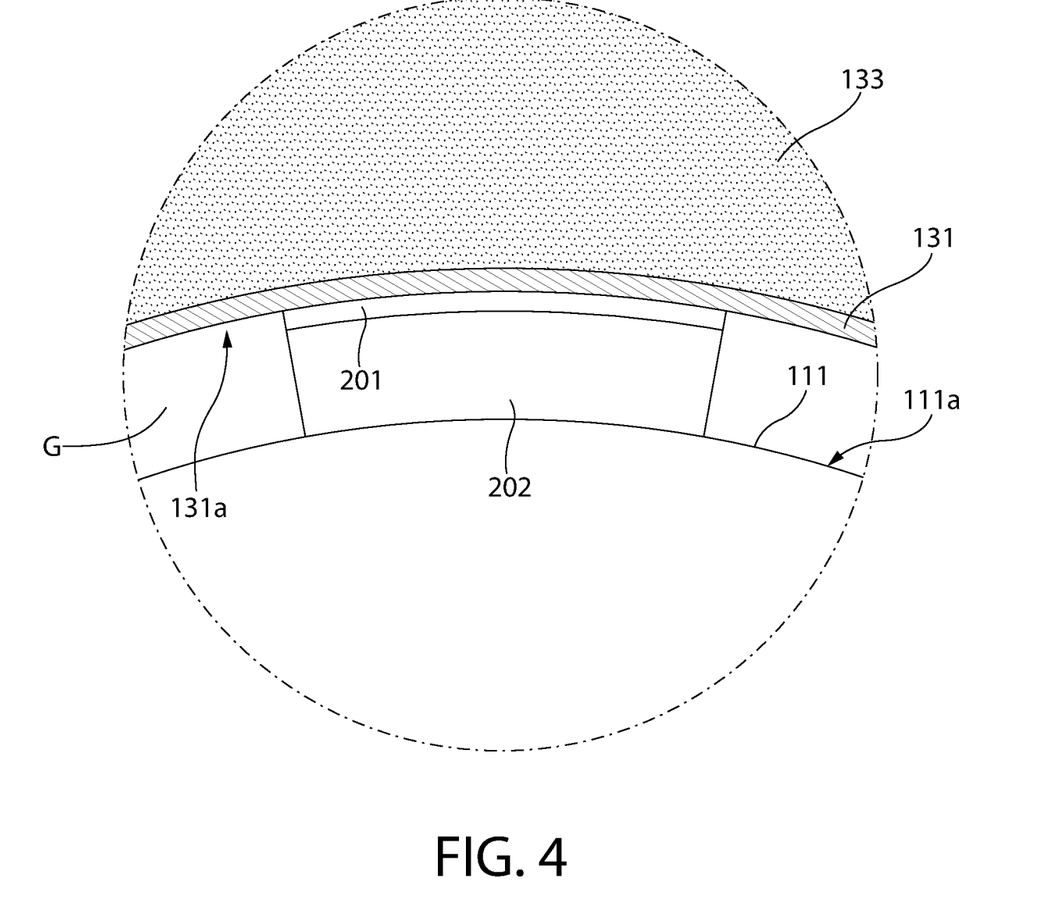
FIG. 4 is an enlarged detail taken from FIG. 3.

FIG. 1 is a side cross sectional view of a first nuclear fuel storage system 100 including a first embodiment of an automatically adjusting seismic restraint system 102 for nuclear fuel storage according to the present disclosure. FIGS. 2-4 are additional views and details thereof.

With reference to FIGS. 1-4, the fuel storage system 100 comprises cylindrical nuclear spent fuel canister 110 (i.e. one fuel storage component) and a cylindrical outer storage overpack or cask 130 (another fuel storage component).

Canister 110 is a vertically-elongated fuel storage component or vessel defining a vertical centerline Vc and having a cylindrical body 110a comprising an outer shell 111 which defines an internal cavity 113 that houses spent nuclear fuel (SNF) represented schematically in FIG. 1. Outer shell 111 defines a vertically and circumferentially extending cylindrical sidewall 111a extending from the top to bottom of the canister. The SNF may be in the form of fuel assemblies 124 shown in FIG. 8. The fuel canister may be any suitable commercially-available canister such as a Multi-Purpose Canister (MPC) available from Holtec International of Camden, New Jersey Such canisters are well known in the art without further elaboration necessary. The fuel canister 110 is preferably constructed of stainless steel and is a hermetically sealed vessel including a circular lid 115 and bottom plate 114 seal welded to the vertical shell 111 of the canister. Canister 110 provides the primary containment for the nuclear fuel stored therein but is not radiation shielded when removed from the spent fuel pool 121 of the nuclear generation plant where the canister is loaded with nuclear fuel under water which provides the radiation shielding in that wetted environment.

Figure 7:
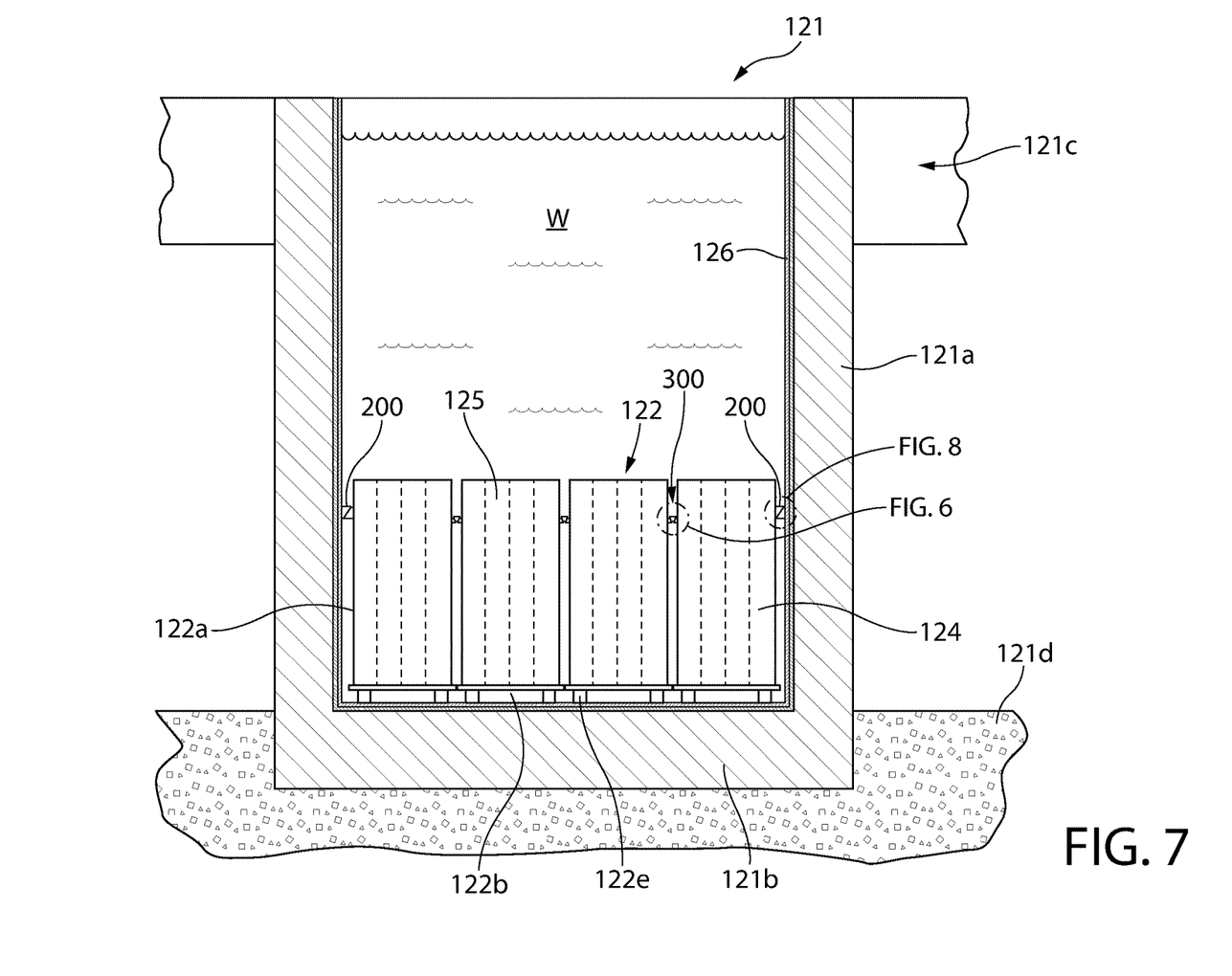
FIG. 7 is a side cross sectional view of a second embodiment of a nuclear fuel storage system comprising a nuclear fuel rack submerged in a spent nuclear fuel pool, and multiple seismic restraint assemblies comprising at least two different types according to the present disclosure.

Storage cask 130 provides radiation shielding for the fuel canister 110 when out of the fuel pool 121 (see also FIG. 7). Cask 130 is heavy radiation-shielded fuel storage component or vessel having a body 130a comprising a steel outer shell 132, steel inner shell 131, and annular space 137 between the shells. Annular space 137 is filled with a radiation shielding material 133 which in one embodiment comprises concrete fill. Other radiation shielding materials be used in addition to or instead of concrete as needed including boron-containing materials.

Cask 130 defines an internal cavity 135 which insertably receives fuel canister 110 therein as shown in FIG. 1. Cask 130 also includes a fixed steel baseplate 136 welded to the bottom of the inner and outer shells 131, 132 and removable top lid 134 which is a steel and concrete filled structure for radiation shielding. Lid 134 may be removed to load fuel canister 110 in the cask and is then replaced to close up the cask.

Inner shell 131 of cask 130 defines a cylindrical vertical wall 131a inside cask cavity 135 on one side of inter-body gap G which faces the cylindrical sidewall 111a of canister 110.

It bears noting that storage casks such as cask 130 are a massive and heavy structures having typical heights of about 20 feet, weight of about 135 to 160 tons without the fuel canister, inner diameter defined by inner shell 131 of about 6 feet, outer diameter defined by outer shell 132 of about 11 feet, and height of its internal cavity 135 which houses canister 110 of about 16 feet. Such casks are commercially-available from manufacturers such as the HI-STORM 100S casks by Holtec International of Camden, New Jersey Such structures must be moved by large track-driven cask crawlers well known in the art having a sufficient lifting capacity to raise and transport the heavy cask. For all intents and purposes, the massive nuclear fuel storage cask is therefore considered a "stationary" fuel storage component relative to the free-standing fuel canister 110 since the cask is not readily movable and undergoes no significant thermal growth.

Fuel canister 110 has an outer diameter smaller than the diameter of cask internal cavity 135, thereby forming an inter-body gap G in the form of annulus 138 extending circumferentially around the entire canister.

The nuclear fuel canister 110 may be considered a "free-standing" first fuel storage component since it is not fixedly mounted inside the outer storage cask 130 and therefore is free to undergo movement when exposed to the vibratory forced generated by a seismic event. Conversely, the cask 130 in turn may be considered a stationary second fuel storage component due to its massive heavy steel and concrete structure and on substantial thermal growth as previously described herein.

With continuing reference to FIGS. 1-4, the seismic restraint system 102 in one embodiment includes at least one 2-piece seismic restraint assembly 200 located at the interface (i.e. inter-body gap G) formed between nuclear fuel canister 110 and outer storage cask 130. Preferably for this installation, a plurality of circumferentially spaced apart seismic restraint assemblies 200 are installed all around the canister in inter-body gap G (see, e.g., FIG. 3) to support the canister 360 degrees on all sides and prevent its excessive movement during a seismic event while simultaneously allowing for thermal expansion or contraction of the canister during normal operation. The restraint assemblies may be equally spaced apart in some embodiments but are not limited to such an arrangement.

Although four seismic restraint assemblies 200 are shown for convenience of illustration, fewer or more seismic restraint assemblies may be provided in other embodiments as needed. Preferably, at least four assemblies 200 are provided to radially/laterally support and stabilize the sides of each quadrant of the canister during a seismic event. In practice, the number of seismic restraint assemblies would be arrayed around the annular gap such that the unevenness of the annulus 138 (inter-body gap G) around the circumference of the canister 110 does not prevent their successful installation and use. In one preferred but non-limiting embodiment, eight circumferentially and equally spaced apart seismic restraint assemblies 200 each spanning about 15 degrees of the circumference of the canister 110 may suffice to render the necessary function.

The seismic restraint assemblies 200 may be vertically positioned where appropriate within the inter-body gap G. In one embodiment, each seismic restraint assembly is preferably positioned in the upper half of the inter-body gap, and more preferably proximate to the top of the inter-body gap near the top end of canister 110. During a seismic event, the vibratory forces imposed on the canister will tend to tip or tilt its top end radially outward toward the cask body 130a and would make contact in the upper region of the canister and inter-body gap if not stabilized by the seismic restraint assemblies. Accordingly, the upper portion of fuel canister 110 may be considered to be radially supported in an automatically adjustable and movable manner by the seismic restraint assemblies 200, as further described herein.

Each seismic restraint assembly 200 includes a stationary wedge member 201 and a mating complementary configured movable loose wedge member 202 slideably engaged with the stationary wedge member. Stationary wedge member 201 is fixedly and rigidly coupled to body 130a of outer storage cask 130 inside cask cavity 135. More specifically, the stationary wedge member in one embodiment may be fixedly coupled to the cylindrical vertical wall 131a defined inner shell 131 in the cask 135 within in inter-body gap G. Stationary wedge member 201 may be fixedly coupled to cask inner shell 131 by any suitable means known in the art, such as for example without limitation welding, bolting, or other techniques.

The loose wedge members 202 and stationary wedge members 201 are formed from horizontally elongated metallic bars having greater length (measured horizontally in the installed position) than height or width. The length may be greater than 5 times the vertical height. Each of the loose wedge member 202 and stationary wedge member 201 have a wedge-shaped and substantially triangular body in transverse cross section albeit slightly truncated at upper and lower ends (see, e.g., FIG. 2). The terms "substantially" connotes that the two opposite acutely angled pointed corners of the wedge member have slightly been cut across flat as shown to facilitate physical handling of the wedges by eliminating these sharp corner regions. The overall configuration of the wedges however remains substantially triangular as shown.

Stationary wedge member 201 includes a vertical side defining vertical surface 207, horizontal side defining horizontal surface 206, and a sloped or inclined load bearing surface 205 extending between the vertical and horizontal surfaces. Geometrically speaking, load bearing surface 205 is the hypotenuse of the triangular wedge member 201. The vertical surface 207 is the portion of wedge member 201 which is fixedly welded or otherwise coupled to the vertical wall 131a of the cask body 130a (i.e. a fuel storage component). An acute angle of incline A1 is defined between vertical surface 207 and inclined load bearing surface 205 of stationary wedge member 201 as best shown in FIG. 2A-B.

The movable loose wedge member 202 is slideably engaged with and supported by stationary wedge member 201. Loose wedge member 202 includes a vertical side defining vertical surface 208, horizontal side defining horizontal surface 203, and a sloped or inclined load bearing surface 204 extending between the vertical and horizontal surfaces. Geometrically speaking, load bearing surface 204 is the hypotenuse of the triangular wedge member 201. The vertical surface 208 is the portion of wedge member 201 slideably engages the vertical sidewall 111a of the fuel canister 110 (i.e. another fuel storage component) as the wedge member moves upwards/downwards along the stationary wedge member 201. An acute angle of incline C is defined between vertical surface 208 and inclined load bearing surface 204 of loose wedge member 202 as best shown in FIGS. 2A-B.

Each seismic restraint assembly 200 illustrated in FIG. 2 serves to close a portion of the inter-body gap G between the fuel canister 110 and inner shell 131 of outer storage cask 130 under normal operating conditions. Specifically, the loose wedge members 202 close the radial gap between a respective stationary wedge member 201 and the vertical sidewall 111a of canister 110. Accordingly, the loose wedge member 202 of each seismic restraint assembly is inverted in relation to the stationary wedge member 201 so that the loose wedge member "keys" into the complementary configured stationary wedge member as shown. In loose wedge member 202, the horizontal surface 203 is at the top whereas horizontal surface 206 of stationary wedge member 201 is at the bottom to allow formation of the keyed flat interface between the wedge members. The wedge members 201, 202 each have triangular bodies which may be categorized as right triangles.

Both stationary wedge member 201 and the movable loose wedge member 202 are made of a suitably strong metal, and in preferred embodiments may be formed of stainless steel for corrosion resistance. This construction ensures that rust formation does not form on the mating inclined load bearing surfaces 204, 205 which would increase surface roughness and friction at the inter-wedge interface thereby adversely affecting the ability of the loose wedge member to slide up/down along the stationary wedge member 201 during normal thermal expansion/contraction of the canister 110 and during a seismic event.

As best shown in FIGS. 3 and 4 of the first embodiment, the stationary wedge members 201 and movable loose wedge members 202 of the seismic restraint assemblies 200 each have an arcuately curved body in top view which conforms to the radius of curvature of the inter-body gap G (and canister 110 and cask 130 which forms the annulus 138 that defines the gap). Wedge members 201, 202 therefore comprise metallic bars bent to shape to form arc segments complementary configured to the radius of curvature of the fuel canister 110 and inner shell 131 of outer storage cask 130.

The loose wedge member 202 is configured and operable such that its inclined load bearing surface 204 slides along and maintains contact with the inclined load bearing surface 205 of the stationary wedge member when the loose wedge member is displaced vertically upwards, or alternatively slides vertically back downwards during a seismic event or under thermal expansion of the canister. The inclined load bearing surfaces of both the stationary and loose wedge members 201, 202 are flat defining a flat-to-flat sliding interface therebetween.

Loose wedge member 202 is supported in place on stationary wedge member 201 and is prevented from completely disengaging the stationary wedge member by only the inclined load bearing surface of the stationary wedge member. In the non-limiting illustrated embodiment, there are no other supports or connections of any kind to any other structures or components which might stabilize or provide support for the movable loose wedge member 202 which may therefore be considered to be "freely" movable.

Figure 5:
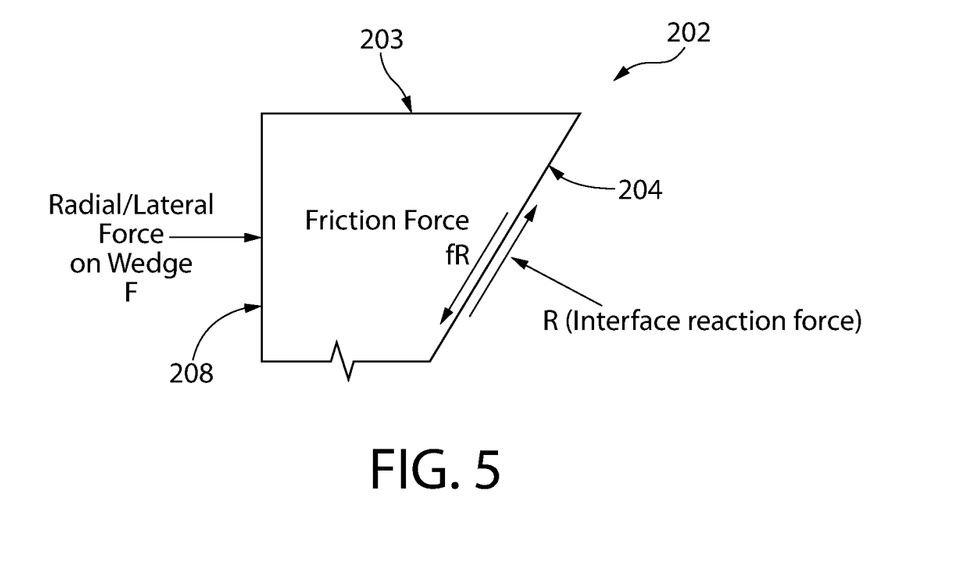
FIG. 5 is a partial side view of the movable loose wedge member of the seismic restraint assembly showing the reaction forces acting on the wedge member imposed by thermal expansion of the fuel canister of FIG. 1.

In operational theory of the seismic restraint system 102, with additional reference to FIG. 5, if the nuclear fuel canister 110 (e.g., a first fuel storage component or "Body 1") were to thermally shrink in the radial direction compared to the cask 130 (e.g., a second fuel storage component or "Body 2"), then the movable loose wedge member 202 will simply slide downwards inclined load bearing surface 205 of stationary wedge member 201 to maintain closure of the inter-body gap G at the seismic restraint assembly 200. On the other hand, if canister 110 (Body 1) were to thermally expand radially from thermal effects due to decay heat emitted from the fuel assemblies 124 stored therein more than cask body 130a (Body 2), the loose wedge member 202 will slide upwards along inclined load bearing surface 205 of stationary wedge member 201 if the angle of incline C of the loose wedge member is sufficiently large enough so that the outwardly acting radial force F imposed on the loose wedge member due to the thermal expansion can overcome the frictional resistance force fR at the inclined interface between the stationary wedge member and loose wedge member 202.

It bears noting that as the angle of incline C becomes larger, inclined load bearing surface 204 of loose wedge member 202 becomes horizontally flatter, and vice-versa. Accordingly, a larger angle of incline results in a flatter load bearing surface 204 which accommodates and allows loose wedge member 202 to slide up along stationary wedge member 201.

Conversely, loose wedge member 202 may not slide upwards along the inclined load bearing surface 205 of stationary wedge member 201 if the angle of incline C of the loose wedge member is too small. In this case, the outwardly acting thermal expansion related radial force F created by canister 110 radial growth would not be sufficient to overcome the frictional resistance force fR at the inclined interface between the stationary wedge member and loose wedge member 202. Rather a compressive stress will develop at the interface in which would bind the loose wedge member 202 and prevent it from sliding, thereby restraining radial thermal growth of the canister 110 which can result in thermal stress cracking of the metal vessel. So a smaller angle of incline C results in a steeper load bearing surface 204 of loose wedge member 202 requiring a greater thermal expansion radial force F to overcome the friction interface force fR and push or displace the loose wedge member upwards along the inclined load bearing surface 205 of stationary wedge member 201.

Accordingly, the proper angle of incline C of loose wedge member 202 can be determined from taking into account the radial thermal growth of the canister 110 (first fuel storage component or Body 1) and radial force F, the frictional forces at the inclined interface between the loose wedge member and stationary wedge member 201 due to the surface roughness of inclined load bearing surfaces 204, 205, and weight of the loose wedge member.

From a canister 110 thermal expansion standpoint, a suitable angle of incline C will therefore be large enough so that the movable loose wedge member 202 will slide and be displaced upwards by thermal growth related radial force F along stationary wedge member 201, thereby relieving the compressive stress.

Referring to FIGS. 2 and 5, the limiting value of the angle of incline C (called the threshold or critical angle CA) is when the angular reaction force R acting along the interface between the inclined load bearing surfaces 204, 205 of the seismic restraint assembly wedges, which tends to push or slideably displace the movable loose wedge member 202 upwards equals the friction force fR resisting the sliding movement of the loose wedge member. In practically every application, it is desirable to have the critical angle CA large enough so that the movable loose wedge member 202 rises upwards along stationary wedge member 201 to relieve the radial thermal stress created by radial force F.

Referring to FIG. 5 specifically, "F" is the thermal expansion radial force applied on the movable loose wedge member 202, "R" is the angular reaction force acting on the inclined load bearing surface 204, 205 interface which is the angular vertically acting component of the radial force F acting on the inclined interface surface, and fR is the frictional force acting at the inclined load bearing surfaces interface acting in an opposition direction to angular reaction force R as noted by the directional force arrows shown.

The vertical force equilibrium equations with respect to the untethered movable loose wedge member 202 yields are readily set down as follows:

$R \sin C = f R \cos C$ or $f = \tan C$.

The vertical force "V" tending to dislodge and eject the movable loose wedge member 202 from the stationary wedge member 201 is therefore: $V = R \sin C - f R \cos c$ As can be seen from the above, the greater the value of the angle of incline C, the larger the force of ejection acting on the loose wedge member 201. It follows that dislodgment or unseating of the loose wedge member from stationary wedge member 201 entirely negates the ability of the seismic restraint assembly 200 to restrain the canister 110 in any manner during thermal growth; a situation which must be avoided.

And the horizontal force equilibrium equations with respect to the loose wedge member 202 yields:

$$F = R \cos c + f R \sin c \text{ or } R = F/(\cos c + f \sin c)$$

The design of the seismic restraint assembly 200 however cannot be based on the foregoing thermal growth/expansion considerations only. The case of an earthquake loading occurring during a seismic event however is somewhat different than thermal expansion. The large vibratory inertia force induced in and imposed on canister 110 (first fuel storage component or Body 1 in the present example) due to the earthquake would tend to exert an ejection or dislodgement force on the movable loose wedge member 202 whose magnitude would be governed by the angle of incline C: A larger angle C means a larger force of ejection. Because the seismic event related inertia force imposed on canister 110 is typically quite large, the ejection force will be correspondingly larger. If the ejection force is large enough, then the movable loose wedge member 202 may be suddenly ejected from its seat causing the lateral or radial seismic restraint system to become inoperative. To prevent this undesirable condition from occurring, it is necessary to select the correct value of the angle of incline C.

Ideally, the angle of incline C of loose wedge member 202 should be slightly greater than the critical angle CA. However, critical angle CA depends on the coefficient of friction at the inclined interface between the loose and stationary wedge members 202, 201 which can vary in the manner of Gaussian distribution. To develop a reliable design, it would be necessary to conduct a statistically significant number of measurements of friction coefficients between interfacing inclined load bearing surfaces 204, 205 using metal coupons made of the same materials. The mean plus three standard deviations should be used to define the proper angle of incline C. By using an actual design value of the angle of incline C of loose wedge member 202 that is slightly larger than the threshold or critical angle CA, say approximately 5-15% larger in some non-limiting embodiments, the sliding of the movable loose wedge member upwards or downwards along the stationary wedge member 201 will be ensured under seismic conditions without running the risk of a sudden ejection or dislodgement of loose wedge member 202 as well as accommodate the sliding movement necessary for thermal expansion of the canister 110 during normal operating conditions (i.e. no seismic activity). In one embodiment, the angle of incline C may be about 5% larger than the critical angle CA to prevent ejection of the loose wedge member 202 while providing sliding movement along stationary wedge member 201 for thermal expansion of the fuel canister 110.

It is evident from the above that the optimum angle of incline C is a function of the metallic interface materials selected for the wedge members 201, 202 and their respective coefficient of friction of the mating load bearing surfaces 204, 205. It well within the ambit of those skilled in the art to determine the optimum angle of incline based on the above equations and considerations for various design applications.

FIG. 2A shows the seismic restraint assembly 200 in first operating position. The movable loose wedge member 202 is in a first lower position relative to the stationary wedge member 201. When the nuclear fuel canister 110 (a first fuel storage component or Body 1) thermally expands or grows outwards in the radial direction, the inter-body gap G between the canister and inner shell 131 of the outer storage cask 130 housing the canister closes and shrinks in the radial dimension. The radial growth may be as much as +/−⅜ inches in some cases. The thermal expansion related radial force F imposed on loose wedge member 202 by the closing gap G displaces and drives the loose wedge member upwards along the fixed stationary wedge member 201 fixedly coupled to inner shell 131 of the cask 130. Loose wedge member 202 automatically slides upwards along inclined load bearing surface 205 of stationary wedge member 202 and maintains contact therewith during this movement. FIG. 2B shows the new second upper position of the loose wedge member. This sliding displacement and movement of loose wedge member 202 releases or prevents the buildup of compressive stress between the mating wedge members. The seismic restraint assembly 200 therefore automatically adjusts for any degree of thermal expansion of the canister 110 within a predefined range of radial growth.

As the decay heat emitted by the fuel assemblies 124 stored in canister 110 diminishes over time, the canister may shrink in the radial dimension and inter-body gap widens. The loose wedge member 202 will automatically slide back downwards along inclined load bearing surface 205 of stationary wedge member 201 due to the force of gravity acting on and the weight of the loose wedge member. The seismic restraint assembly 200 therefore advantageously automatically adjusts for any degree of thermal expansion or shrinkage of the canister 110 within a predefined range of radial motion. It is well within the ambit of those skilled in the art to readily determine an appropriate maximum range of radial motion which can be expected during service of the seismic restraint system 102 based on the heat load of the spent nuclear fuel to be stored in canister 110.

Figure 8:
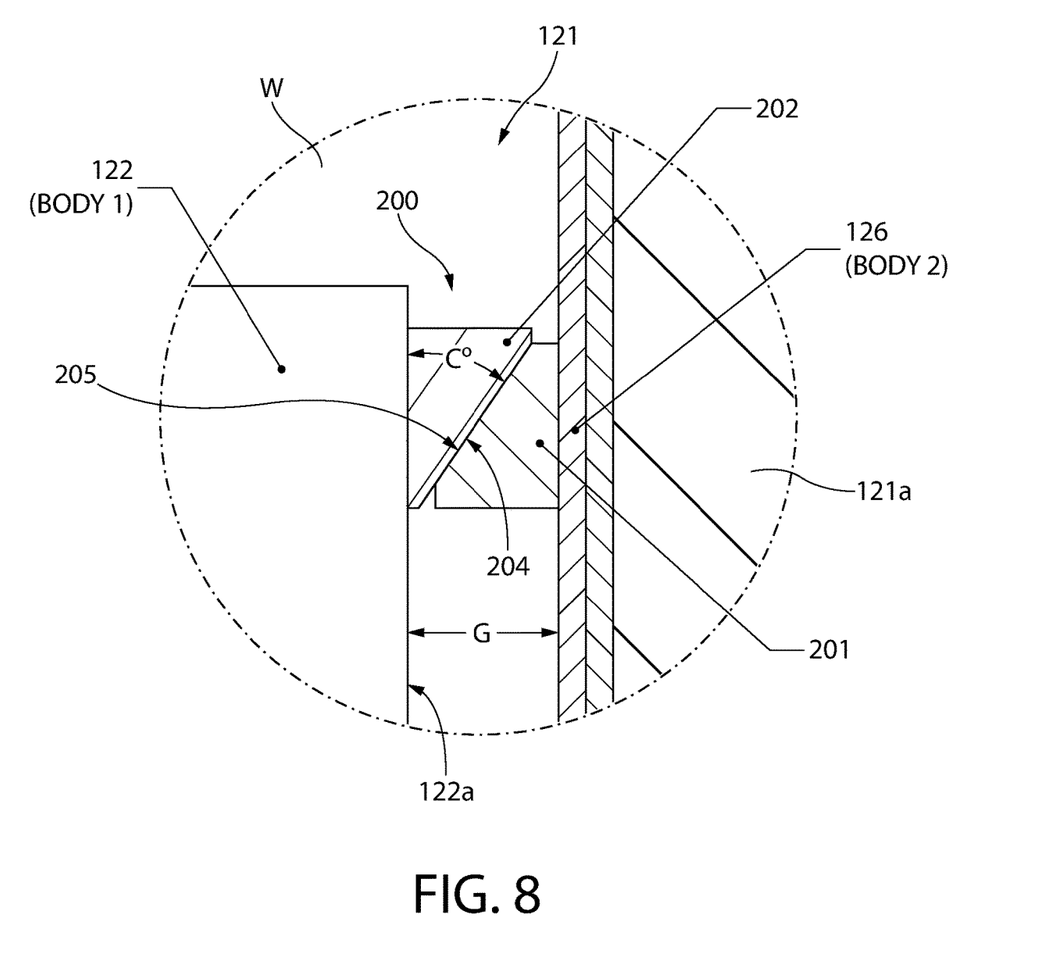
FIG. 8 is an enlarged detail taken from FIG. 7 of one of the 2-piece seismic restraint assemblies.

FIGS. 7 and 8 show another type of nuclear fuel storage system 100 using the first embodiment of automatically adjusting seismic restraint system 102 previously described herein for nuclear fuel storage according to the present disclosure. The seismic restraint assembly 200 comprising loose and stationary wedge members 201, 202 are applied in a submerged fuel storage setting to provide seismic restraint of nuclear spent fuel storage racks in a spent fuel pool 121 which hold spent nuclear fuel assemblies 124.

The spent nuclear fuel (SNF) pool 121, also referenced to herein as a "fuel pool" for brevity, is filled to surface level with pool water W. Typical fuel pools 121 may have a total depth of approximately 40 feet as a non-limiting example.

Fuel pool 121 includes a plurality of vertical walls 121a rising upwards from a horizontal flat floor slab 121b; all of which may be formed of thick reinforced concrete structure to form a water-tight basin for containing the pool water. A thick concrete top pad 121c surrounds the fuel pool and can support the weight of equipment used to access the pool for loading and unloading fuel assemblies 124 from fuel racks 122 submerged in the pool water W which cools the fuel assembly and provides radiation shielding. The floor slab 121b may be embedded in engineered fill 121d. The foregoing aspects of spent nuclear fuel pools are well known in the art without further undue elaboration necessary.

Figure 9:
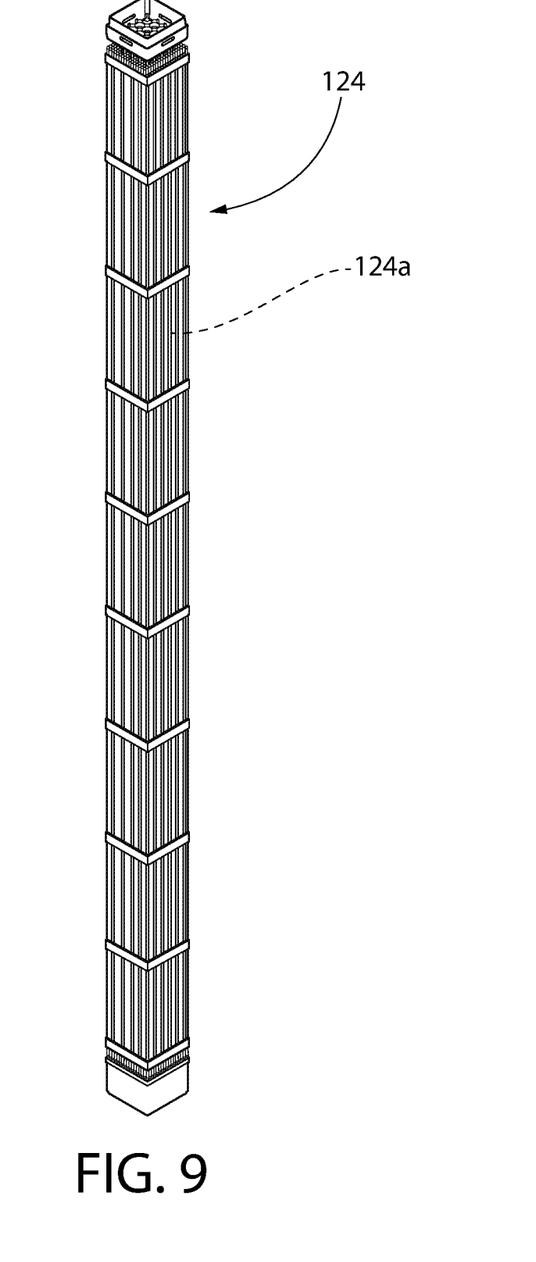
FIG. 9 is a perspective view of a rectangular shaped nuclear fuel assembly containing nuclear fuel which can be stored in the fuel canister of FIG. 1 or fuel rack of FIG. 7.

With continuing reference to FIGS. 7 and 8, the pool water W in fuel pool 121 is heated by decay heat emitted from a plurality of fuel assemblies 124 (see, e.g., FIG. 9) stored in the upwardly open cells 125 of a plurality of fuel racks 122 seated on the floor slab 121b of the fuel pool. Fuel racks have a prismatic structure including a baseplate 122b and plurality of vertically-elongated wall structures 122a such as tubes or interconnected slotted plates that define the open cells 125 which receive the fuel assemblies. The vertical walls structures 122a may alternatively be referred to as walls 122a herein for brevity, but may be the same structures. The outermost exposed vertical walls 122a of each fuel rack 122 form the four sides or sidewalls of the rectilinear configured racks (i.e. rectangular cuboid shaped). These outer walls 122a are vertically straight and flat, and meet adjoining vertical outer walls of the fuel rack perpendicularly.

Baseplate 122b and wall structures 122a may be formed of stainless steel in one embodiment for corrosion resistance. The cells 125 may have any suitable cross-sectional shape to accommodate the fuel assemblies which contain the spent nuclear fuel rods 124a. In one embodiment, the open cells may have a rectilinear cross-sectional shape for inserting fuel assemblies 124 therein having a corresponding rectilinear cross-sectional shape typical of those assemblies used in the United States (see, e.g., FIG. 9). In other embodiments, the cells 125 may have a hexagonal cross-sectional which correspond to those fuel assemblies used outside the United States such as in Russia.

Each fuel rack 122 may include a plurality of pedestals 122e extending downwards from the horizontal baseplate 122b of the fuel racks to engage the fuel pool floor slab 121b. This elevates the fuel racks above the floor slab 121b of fuel pool 121 which allows the pool water W to circulate beneath the fuel racks to cool the fuel assemblies stored therein. The foregoing aspects of fuel racks and fuel assemblies are well known in the art without further undue elaboration necessary.

In the present fuel pool application of seismic restraint assemblies 200, inter-body gap G is formed between the perimeter spent fuel racks 122 adjacent to but spaced apart slightly from the vertical walls 121a of the fuel pool 121. Specifically, the gap G is formed between the outermost vertical wall structures 122a of the perimeter fuel racks 122 and the stainless steel liner 126 fixedly mounted to the inner face of the concrete vertical walls 121a of the fuel pool (best shown in FIG. 8) such as via bolting, or other suitable rigid mounting techniques used in the art. The fuel racks 122 each form a first fuel storage component (or Body 1) and the fuel pool vertical walls 121a from a second fuel storage component (or Body 2) which are counterparts respectively by way of reference to the fuel canister 110 and storage cask 130 assembly previously described herein. The fuel rack 122 thermally grow/expand laterally outwards due to the decay heat emitted by the nuclear fuel assemblies 124 stored in the cells of the racks relative to the fuel pool walls 121a which remain stationary as they are massive heavy concrete structures embedded in the soil or engineered fill 121d (see, e.g., FIG. 7). Each fuel rack 122 may be considered a "freestanding" first fuel storage component since they are not fixedly mounted to the fuel pool flat floor slab 121b. The fuel pool vertical walls 121a may be considered a stationary second fuel storage component due to their massive and heavy structure.

With continuing reference to FIGS. 7 and 8, in the spent nuclear fuel pool and fuel rack fuel storage system, the stationary wedge members 201 are fixedly and rigidly coupled to the metal pool liners 126 such as via welding, bolting, a combination thereof, or other suitable rigid fastening methods known in the art. The vertically movable loose wedge members 202 bridge the space between the stationary wedge members 201 and the outermost vertical wall structures or walls 122a of each fuel rack 122 facing the fuel pool walls 121a to provide sliding seismic restraint of the fuel racks in the vent of an earthquake and associated vibratory forces created during such an event. This prevents the fuel racks from directly impacting the fuel pool walls, which could potentially damage the pool liners 126 and/or fuel racks. At the same time, the seismic restraint assemblies 200 advantageously allow for lateral thermal expansion or contraction of the fuel racks 122 which widens or narrows the inter-body gap G between the perimeter fuel racks and the fuel pool walls 121a. The loose and stationary wedge members 201, 202 function in the same manner shown in FIGS. 2A-B and previously described herein.

Each fuel rack 122 includes one or more 2-piece seismic restraint assemblies 200 each comprising a pair of loose wedge members 202 and stationary wedge members 201 disposed in inter-body gap G between the outer vertical wall 122a of the fuel rack 122 adjacent the fuel pool walls 121a.

The assemblies 200 are positioned proximate to the top end of the vertical wall 122a of the fuel rack as shown in FIG. 7. In contrast to the arcuately curved loose wedge members 202 and stationary wedge members 201 used for the cylindrical fuel canister 110 and cask 130 fuel storage system, the loose wedge members 202 and stationary wedge members 201 as applied to fuel racks 122 are formed from linearly straight and horizontally elongated metallic bars having greater length (measured horizontally in the installed position) than height or width. The straight bars conform to the straight sides of the rectangular cuboid fuel racks.

Figure 6:
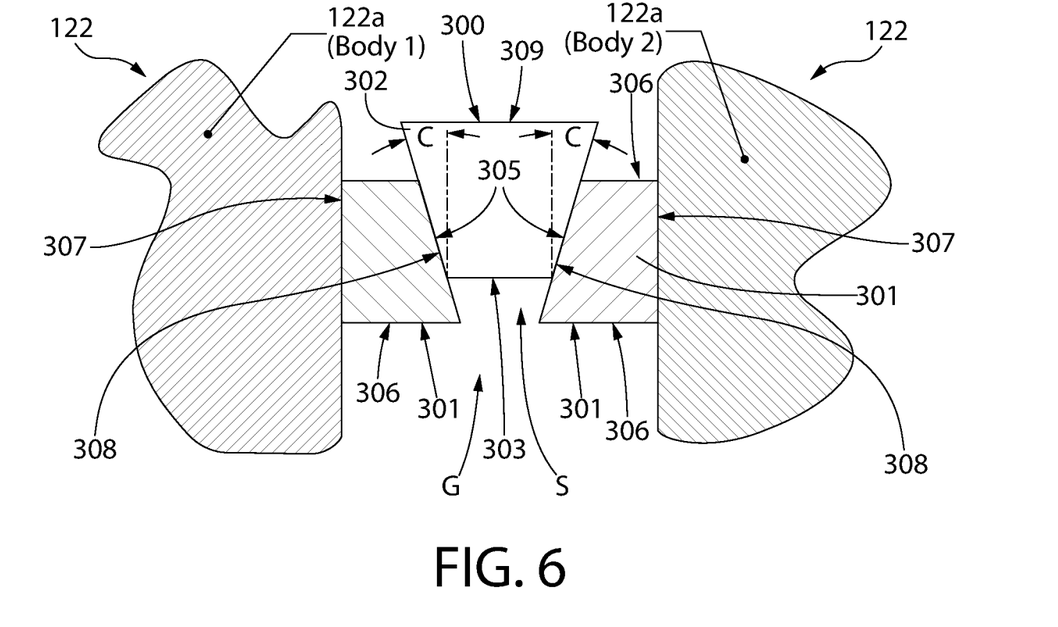
FIG. 6 an enlarged detail taken from FIG. 7 described below and showing a 3-piece seismic restraint assembly for use between two free-standing fuel storage components.

In another aspect of the seismic restraint system 102, the interstitial gap or space S between each pair of adjacent "free-standing" fuel racks 122 may also include seismic restraint assemblies configured to allow for not only thermal expansion/contraction of the racks, but advantageously also provides seismic protection for the racks to prevent one rack from impacting the adjacent rack caused by vibratory forces occurring during a seismic event. Because the fuel racks are "free-standing" structures (i.e. not fixedly fastened to the fuel pool), a suitable seismic restraint which can accommodate two adjacent fuel storage components each subject to thermal expansion/contraction is required. FIGS. 6 and 7 show such a 3-pieced seismic restraint assembly 300 for this purpose which is installed between adjacent fuel racks.

Referring to FIGS. 6 and 7, seismic restraint assembly 300 comprises a pair stationary wedge members 301 and a vertically movable and double-tapered wedge member 302 located at the interstitial space S between the stationary wedge members which separates them. Wedge member 302 therefore bridges the interstitial space S between an opposing pair of stationary wedge members 301 in an automatically adjusting manner. The inter-body gap G is defined in this embodiments of fuel storage components as extending laterally between each pair of adjacent fuel racks 122.

Stationary wedge members 301 are fixedly and rigidly coupled to the outermost vertical walls 122a of each fuel rack 122 by any suitable method such as welding, bolting, combination thereof, or other method known in the art. Each stationary wedge member 301 includes a pair of opposing top and bottom horizontal surfaces 306, a straight vertical surface 307 extending between pair of the surfaces 306, and an inclined load bearing surface 305 extending between the pair of surfaces 306 opposite the vertical surface 307, as best shown in FIG. 6. In one embodiment, each stationary wedge member 301 may have a body configured in transverse cross section as a right trapezoid (also referred to as a right-angled trapezoid) with two adjacent right angles. Other suitable geometrically shaped stationary wedge members 301 may be used so long as an angled or inclined load bearing surface 205 is defined for slideably engaging double-tapered wedge member 302.

Double-tapered wedge member 302 may have a trapezoidal shaped body transverse cross section in one embodiment. In the non-limiting illustrated embodiment, wedge member 302 may geometrically be an isosceles trapezoid where the base angles have the same angle. Wedge member 302 includes a top horizontal surface 309, opposite bottom horizontal surface 303, and a pair of opposing inclined load bearing surfaces 308 between the two horizontal surfaces as best shown in FIG. 6. Top horizontal surface 309 is longer than bottom horizontal surface 303 when wedge member 302 is installed as shown. The inclined load bearing surfaces 308 have equal lengths in preferred but non-limiting embodiments.

Inclined load bearing surfaces 308 slideably engage a respective inclined load bearing surfaces 305 of stationary wedge members 301. Each inclined load bearing surface 308 defines an acute angle of incline C with respect to the vertical direction or plane. The optimum angle of incline C is determined similarly to the approach described above for seismic restraint assembly 200 to balance thermal expansion of the fuel racks with maximum seismic protection. Wedge members 301 and 302 are similarly made of stainless steel in preferred embodiments.

One or more 3-piece seismic restraint assemblies 300 may be installed within the inter-body gap G between adjacent fuel racks 122 preferably proximate to the top of the fuel racks as shown in FIG. 7. The double-tapered wedge member 302 and pair of stationary wedge members 301 and stationary wedge members 201 as applied to adjacent fuel racks 122 are formed from linearly straight and horizontally elongated metallic bars having greater length (measured horizontally in the installed position) than height or width. The straight bars conform to the straight sides of the rectangular cuboid fuel racks.

The 3-piece seismic restraint assemblies 300 operate similarly to the 2-piece seismic restraint assemblies 200 previously described herein. In general, a seismic event or the thermal expansion or contraction of at least one of the pair of adjacent fuel racks 122 in fuel pool 121 shrinks inter-body gap G, thereby slideably displacing and moving the unconstrained double-tapered wedge member 302 upward or downwards between the opposing pair of stationary wedge members 301 along the dual inclined surface interfaces.

While the foregoing description and drawings represent examples of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes as applicable described herein may be made without departing from the spirit of the invention. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed examples are therefore to be considered in all respects as illustrative and not restrictive, the scope of the invention being defined by the appended claims and equivalents thereof, and not limited to the foregoing description or examples. Rather, the appended claims should be construed broadly, to include other variants of the invention, which may be made by those skilled in the art without departing from the scope and range of equivalents of the invention.

What is claimed is:

1. An automatically adjusting seismic restraint system for nuclear fuel storage comprising:
    a free-standing first fuel storage component configured to contain nuclear fuel and defining a vertical centerline;
    a stationary second fuel storage component configured to receive the first fuel storage component;
    an inter-body gap formed between the first and second fuel storage components;

at least one seismic restraint assembly disposed in the inter-body gap and including a stationary wedge member and a movable loose wedge member;

the stationary wedge member fixedly coupled to the second fuel storage component, the stationary wedge member being disposed in the inter-body gap;

the stationary wedge member defining an inclined load bearing surface;

the movable loose wedge member disposed in the inter-body gap, the loose wedge member defining an inclined load bearing surface slideably engaged with the inclined load bearing surface of the stationary wedge member;

wherein during a seismic event or thermal expansion of the first fuel storage component, the first fuel storage component moves towards the second fuel storage component which shrinks the inter-body gap and the loose wedge member is vertically displaced relative to the stationary wedge member.

2. The system according to claim 1, wherein the loose wedge member is configured and operable such that its inclined load bearing surface slides along and maintains contact with the inclined load bearing surface of the stationary wedge member when the loose wedge member is displaced vertically.

3. The system according to claim 2, wherein the inclined load bearing surfaces of both the stationary and loose wedge members are flat defining a flat-to-flat sliding interface therebetween.

4. The system according to claim 1, wherein the loose and stationary wedge members are each triangular shaped in transverse cross section.

5. The system according to claim 4, wherein the inclined load bearing surface of the loose wedge member is disposed at an acute angle to the vertical centerline of the first fuel storage component.

6. The system according to claim 5, wherein the stationary wedge member comprises a horizontal surface located at a bottom of the stationary wedge member, and the loose wedge member comprises a horizontal surface located at a top of the loose wedge member and spaced vertical apart above the entire stationary wedge member.

7. The system according to claim 6, wherein the loose wedge member further comprises a vertical surface opposite the inclined load bearing surface and intersecting the horizontal surface perpendicularly.

8. The system according to claim 7, wherein the loose wedge member defines an acute angle of incline between an intersection of its vertical surface and its inclined load bearing surface, the angle of incline being selected to be approximately 5% larger than a critical angle so the loose wedge member will remain engaged with the stationary wedge member and not be dislodged therefrom during a seismic event.

9. The system according to claim 7, wherein the inter-body gap is defined between a vertical sidewall of the first fuel storage component and a vertical wall of the second fuel storage component.

10. The system according to claim 9, wherein the vertical surface of the loose wedge member slideably engages the vertical sidewall of the first fuel storage component when the loose wedge member is displaced vertically.

11. The system according to claim 9, wherein the first fuel storage component is a cylindrical fuel canister which contains spent nuclear fuel, the second fuel storage component is a cylindrical outer cask defining a cavity which holds the fuel canister, and the inter-body gap is an annulus extending circumferentially between the fuel canister and cask.

12. The system according to claim 11, further comprising a plurality of circumferentially spaced apart seismic restraint assemblies disposed in the annulus.

13. The system according to claim 11, wherein the loose wedge member and stationary wedge member are formed from horizontally elongated metallic bars comprising complementary arcuately curved shapes.

14. The system according to claim 9, wherein the first fuel storage component is a fuel rack which contains a plurality of spent nuclear fuel assemblies, the vertical wall of the second fuel storage component is a wall of a spent fuel pool containing water in which the fuel rack is submerged, and the inter-body gap is a linear lateral space defined between the fuel rack and the wall of the fuel pool.

15. The system according to claim 14, wherein the loose wedge member and stationary wedge member are formed from horizontally elongated metallic bars having a linear straight shape.

16. The system according to claim 1, wherein the loose wedge member is supported in place and prevented from completely disengaging the stationary wedge member by only the inclined load bearing surface of the stationary wedge member.

17. The system according to claim 1, wherein the loose wedge member and stationary wedge member are formed from horizontally elongated metallic bars having a greater length than a height or width.

* * * * *